(12) United States Patent
Steen

(10) Patent No.: US 11,005,739 B2
(45) Date of Patent: May 11, 2021

(54) SYSTEM AND METHOD FOR MANAGING AND PRESENTING NETWORK DATA

(71) Applicant: Richard K. Steen, Pollok, TX (US)

(72) Inventor: Richard K. Steen, Pollok, TX (US)

(*) Notice: Subject to any disclaimer, the term of this patent is extended or adjusted under 35 U.S.C. 154(b) by 0 days.

(21) Appl. No.: 16/122,068

(22) Filed: Sep. 5, 2018

(65) Prior Publication Data

US 2020/0076714 A1    Mar. 5, 2020

(51) Int. Cl.
*H04L 12/26*        (2006.01)
(52) U.S. Cl.
CPC ............ *H04L 43/067* (2013.01); *H04L 43/04* (2013.01); *H04L 43/12* (2013.01)
(58) Field of Classification Search
CPC ........ H04L 43/067; H04L 43/04; H04L 43/12
See application file for complete search history.

(56) References Cited

U.S. PATENT DOCUMENTS

| | | | | |
|---|---|---|---|---|
| 5,796,951 A * | 8/1998 | Hamner | ............... | H04L 41/0233 709/223 |
| 6,985,901 B1 * | 1/2006 | Sachse | ................. | H04L 41/5032 |
| 7,454,507 B2 * | 11/2008 | Nakata | ............... | H04N 1/32122 709/217 |
| 7,506,253 B2 * | 3/2009 | Armstrong | ............ | G06F 3/1208 715/256 |
| 7,600,183 B2 * | 10/2009 | Stern | ..................... | G06F 17/211 715/243 |
| 7,836,445 B2 * | 11/2010 | La Gesse | .............. | G06F 9/4411 717/174 |
| 8,150,892 B2 * | 4/2012 | Apparao | ................. | G06F 16/48 707/802 |
| 8,380,830 B2 * | 2/2013 | Ladd | ........................ | H04L 29/06 709/222 |
| 8,732,853 B1 * | 5/2014 | Byrne | ..................... | H04L 63/08 726/28 |
| 8,769,258 B2 * | 7/2014 | Stewart | .................... | G06F 21/56 713/152 |
| 9,311,048 B1 * | 4/2016 | Kapoor | ............. | G06K 9/00442 |
| 9,330,264 B1 * | 5/2016 | Hutton | .................. | G06F 16/285 |
| 9,392,471 B1 * | 7/2016 | Thomas | ........... | H04W 36/0083 |
| 9,514,205 B1 * | 12/2016 | Yazicioglu | ............ | G06F 16/254 |
| 9,515,999 B2 * | 12/2016 | Ylonen | ................. | H04L 63/062 |
| 9,632,851 B1 * | 4/2017 | Johansson | ............... | G06F 9/543 |

(Continued)

*Primary Examiner* — John M Macilwinen
*Assistant Examiner* — Abdelbasst Talioua

(57) ABSTRACT

A method for managing network parameter data includes selecting an input source of a plurality of input source types. At least a portion of the selected input source comprising predetermined network parameter data in a first format is accessed. The portion of the selected input source containing the predetermined network parameter data in the first format is harvested and the predetermined network parameter data in the harvested portion of the selected input source is extracted. The extracted predetermined network parameter data in the first format is converted into a second format and stored within a data array. An output format of a predetermined plurality of output formats for the predetermined network parameter data is selected and the predetermined network parameter data is generated in the selected output format from the stored predetermined network data within the data array. The generated predetermined network data is then output in the selected output format.

11 Claims, 17 Drawing Sheets

(56) References Cited

U.S. PATENT DOCUMENTS

| | | | |
|---|---|---|---|
| 9,729,513 B2* | 8/2017 | Hutton | G06F 21/51 |
| 9,870,358 B2* | 1/2018 | Le Chevalier | G06F 16/3334 |
| 9,912,547 B1* | 3/2018 | Douberley | H04L 41/12 |
| 10,070,350 B2* | 9/2018 | Yao | H04W 24/08 |
| 2001/0002851 A1* | 6/2001 | Shimada | H04N 21/6125 |
| | | | 348/423.1 |
| 2001/0042078 A1* | 11/2001 | Anwar | G06T 15/00 |
| | | | 715/255 |
| 2003/0115284 A1* | 6/2003 | Henry | G06Q 30/02 |
| | | | 709/217 |
| 2004/0059604 A1* | 3/2004 | Zaleski | G06Q 50/22 |
| | | | 705/2 |
| 2004/0239977 A1* | 12/2004 | McKinley | G06F 3/1207 |
| | | | 358/1.15 |
| 2005/0096943 A1* | 5/2005 | Siegalovsky | G06Q 30/02 |
| | | | 705/2 |
| 2005/0231739 A1* | 10/2005 | Lee | G06F 3/13 |
| | | | 358/1.1 |
| 2006/0242549 A1* | 10/2006 | Schwier | G06F 3/1206 |
| | | | 715/201 |
| 2006/0282760 A1* | 12/2006 | Tanaka | G06K 9/00469 |
| | | | 715/205 |
| 2006/0285772 A1* | 12/2006 | Hull | G06F 21/78 |
| | | | 382/305 |
| 2007/0250839 A1* | 10/2007 | Van Der Sanden | G06F 9/54 |
| | | | 719/315 |
| 2009/0287837 A1* | 11/2009 | Felsher | G06F 19/328 |
| | | | 709/229 |
| 2010/0070582 A1* | 3/2010 | Somasekhar | H04L 41/026 |
| | | | 709/206 |
| 2010/0250497 A1* | 9/2010 | Redlich | F41H 13/00 |
| | | | 707/661 |
| 2010/0318561 A1* | 12/2010 | Dunie | G06F 16/93 |
| | | | 707/769 |
| 2010/0322373 A1* | 12/2010 | Churilla | G01N 23/046 |
| | | | 378/4 |
| 2011/0185258 A1* | 7/2011 | Grube | G06F 16/182 |
| | | | 714/763 |
| 2011/0261395 A1* | 10/2011 | Kim | G06F 9/445 |
| | | | 358/1.15 |
| 2012/0050806 A1* | 3/2012 | Fukuda | H04N 1/00244 |
| | | | 358/1.15 |
| 2012/0110460 A1* | 5/2012 | Wilson | H04L 41/22 |
| | | | 715/736 |
| 2012/0282968 A1* | 11/2012 | Toskala | H04W 24/10 |
| | | | 455/517 |
| 2013/0120784 A1* | 5/2013 | Takagi | H04N 1/0023 |
| | | | 358/1.14 |
| 2013/0188207 A1* | 7/2013 | Shiohara | G06F 3/1206 |
| | | | 358/1.9 |
| 2013/0198245 A1* | 8/2013 | Kagan | H04L 67/06 |
| | | | 707/812 |
| 2013/0254897 A1* | 9/2013 | Reedy | G06F 21/10 |
| | | | 726/26 |
| 2014/0068429 A1* | 3/2014 | Belbin | G06F 16/972 |
| | | | 715/273 |
| 2014/0280254 A1* | 9/2014 | Feichtner | G06K 9/6253 |
| | | | 707/755 |
| 2014/0362404 A1* | 12/2014 | Miyasaka | G06F 3/1222 |
| | | | 358/1.15 |
| 2015/0286636 A1* | 10/2015 | Elkhou | G06F 16/93 |
| | | | 707/722 |
| 2016/0052659 A1* | 2/2016 | Bowers | B65C 1/021 |
| | | | 156/64 |
| 2016/0065594 A1* | 3/2016 | Srivastava | H04L 63/1433 |
| | | | 726/23 |
| 2016/0186531 A1* | 6/2016 | Harkless | E21B 44/00 |
| | | | 702/6 |
| 2016/0224548 A1* | 8/2016 | Massand | G06F 16/93 |
| 2016/0224577 A1* | 8/2016 | Miller | G06F 16/13 |
| 2016/0253614 A1* | 9/2016 | Miller | G06Q 10/00 |
| | | | 705/7.41 |
| 2017/0147218 A1* | 5/2017 | Volvovski | G06F 11/1076 |
| 2017/0223046 A1* | 8/2017 | Singh | H04L 43/062 |
| 2017/0235890 A1* | 8/2017 | Chen | G06Q 10/06 |
| | | | 705/3 |
| 2017/0300824 A1* | 10/2017 | Peng | G06F 11/3409 |
| 2017/0337251 A1* | 11/2017 | Kordasiewicz | G06F 21/552 |
| 2018/0032518 A1* | 2/2018 | Kordasiewicz | G06F 3/0482 |
| 2018/0082227 A1* | 3/2018 | Goedken | G06Q 10/063 |
| 2018/0089188 A1* | 3/2018 | Kharisma | G06F 3/0481 |
| 2018/0101144 A1* | 4/2018 | Fuger | B41M 3/00 |
| 2018/0219879 A1* | 8/2018 | Pierce | H04L 63/1416 |
| 2018/0248905 A1* | 8/2018 | Cote | G06K 9/627 |
| 2018/0322138 A1* | 11/2018 | Chang | H04N 1/32309 |
| 2018/0330000 A1* | 11/2018 | Noble | G06F 16/438 |
| 2019/0095478 A1* | 3/2019 | Tankersley | H04L 41/5009 |
| 2019/0108112 A1* | 4/2019 | Kannan | G06F 11/3086 |
| 2019/0147402 A1* | 5/2019 | Sitrick | H04N 7/15 |
| | | | 705/301 |
| 2019/0171704 A1* | 6/2019 | Buisson | G06F 17/2294 |
| 2020/0015039 A1* | 1/2020 | Reed | H04W 24/02 |
| 2020/0186473 A1* | 6/2020 | Serrano Garcia | H04L 47/127 |

* cited by examiner

FIG. 4

| PATH CALCULATIONS | SYSTEM:<br>ROUTE: STATE OF XX PHASE 4A<br>FILE: Y:\CUSTOMER\FINAL\STATE.XX\9500UPGD.XX\RECORD-35 | | |
|---|---|---|---|
| TRANSMISSION ENGINEERING | Final Design | 1638<br>52 50 31.0 N<br>94 49 46.0 W | 2432<br>52 54 00.0 N<br>94 43 44.0 W |
| GROUND ELEVATION | Feet | 894.0 | 850.0 |
| MAIN ANTENNA SIZE | Feet | 6.0  PL6-65 | 6.0  PL6-65 |
| MAIN ANTENNA GAIN | dBi | 39.7 | 39.7 |
| MAIN RADOME LOSS | dB | .7  PLASTIC | .7  PLASTIC |
| MAIN CENTERLINE | Feet | 120.0 | 131.0 |
| MAIN FEEDER LENGTH | Feet | 150.0 | 161.0 |
| MAIN FEED LOSS IN dB/100 | Feet | 1.4  EW63 | 1.4  EW63 |
| MAIN FEEDER LOSS | dB | 2.1 | 2.3 |
| PROTECT CHANNEL LOSS | dB | 0.0 | 0.0 |
| OTHER FEEDER LOSSES | dB | .6 | .6 |
| OTHER TRANSMIT LOSSES | dB | 1.6 | 1.6 |
| OTHER RECEIVE LOSSES | dB | 2.1 | 2.1 |
| CALCULATED EIRP | dBm | 67.2 | 67.1 |
| MAXIMUM EIRP (PART 101) | dBm | 76.9 | 76.9 |
| RADIO EQUIPMENT TYPE | | 95MPR67-L128F10-52 | |
| FREQUENCY BAND | MHz | 6700 | |
| PATH LENGTH | Miles | 6.6 | |
| MEAN ANNUAL TEMPERATURE | Deg F | 47.0 | |
| ABSOLUTE HUMIDITY | g/m^3 | 13.4 | |
| CLIMATE FACTOR | | 1.4 | |
| ROUGHNESS FACTOR | Feet | 20.0 | |
| FREE SPACE LOSS | dB | 129.5 | |
| ABSORPTION LOSS | dB | .1 | |
| FIELD MARGIN | dB | 1.0 | |
| DISPERSIVE FADE MARGIN | dB | 61.0 | |
| TRANSMIT POWER | dBm | 32.5 | HOT-STANDBY |
| ATPC POWER REDUCTION | dB | 5.0 | WITH ATPC |
| MAXIMUM RECEIVED SIGNAL | dBm | -22.0 | |
| RECEIVER THRESHOLD | dBm | -79.0 | BER= 10-6 |
| MAIN RECEIVED SIGNAL | dBm | -29.4  MAX POWER | -29.4  MAX POWER |
| THERMAL FADE MARGIN | dB | 49.6 | 49.6 |
| MINIMUM FADE MARGIN | dB | 26.0 | 26.0 |
| EXTERNAL INTERFERENCE FM | dB | N/A | N/A |
| FLAT FADE MARGIN | dB | 49.6 | 49.6 |
| SPACE DIV IMPROVE FACTOR | THERMAL | 1.0 | 1.0 |
| MULTIPATH OUTAGE SECONDS | THERMAL | 1.8 | 1.8 |
| SPACE DIV IMPROVE FACTOR | DIGITAL | 1.0 | 1.0 |
| MULTIPATH OUTAGE SECONDS | DIGITAL | .1 | .1 |
| TOTAL MULTIPATH    1-WAY | seconds | 2.0 | 2.0 |
| UPFADE OUTAGE    1-WAY | seconds | 0.0 | 0.0 |
| PATH AVAILABILITY 1-WAY | percent | 99.9999937  2.0 sec | |
| OUTAGE OBJECTIVE  YEAR | percent | 99.9990000  315.4 sec | |

| Microwave Path Data Sheet | | |
|---|---|---|
| Administrative Information | 2659 XX | 3287 XX |
| City/County | Cleveland / Ruins | Nashbrook / Wilson |
| Status / License Basis | Engineering Proposal / PRIMARY OPERATION | Engineering Proposal / PRIMARY OPERATION |
| Call Sign | HLRT261 | ZFRC129 |
| Licensee Code | T00138 | T00123 |
| Licensee Name | XX, State Of | XX, State Of |
| Radio Service / Station Class | XXXXX | XXXX |
| Site Information | | |
| Latitude (NAD 83) | 53 ° 13' 68.1" N | 53 ° 24' 52.1" N |
| Longitude (NAD 83) | 94 ° 39' 33.0" W | 94 ° 13' 28.9" W |
| Ground Elevation (m/ft-AMSL) | 234.70 / 770.0 | 195.07 / 640.0 |
| Antenna Structure Registration # | 1012345 | 1087296 |
| Path Azimuth (°) | 60.430 | 240.728 |
| Path Length (km / miles) | 40.459 / 25.140 | |
| Transmit Antenna | A66180 | A66180 |
| Manufacturer | Commscope | Commscope |
| Model | PL12-65E | PL12-65E |
| Gain(dBi) / Beamwidth(°) / Tilt(°) | 45.6 / 0.80 / -0.18 | 45.6 / 0.80 / -0.09 |
| Centerline (m / ft - AGL) | 88.39 / 290.0 | 96.01 / 315.0 |
| Receive Antenna | Same As Transmit | |
| Manufacturer | | |
| Model | | |
| Gain (dBi) / Beamwidth (°) | | |
| Centerline (m / ft - AGL) | | |
| Diversity Receive Antenna | A66100 | A66100 |
| Manufacturer | Commscope | Commscope |
| Model | PL8-59D | PL8-59D |
| Gain (dBi) / Beamwidth (°) | 41.6 / 1.40 | 41.6 / 1.40 |
| Centerline (m / ft - AGL) | 76.20 / 290.0 | 83.82 / 275.0 |
| Radio Information | TEQK62 | TEQK62 |
| Manufacturer | Alcatel-Lucent USA, Inc. | Alcatel-Lucent USA, Inc. |
| Model | 95MPR61-L128F30-161-S | 95MPR61-L128F30-161-S |
| Model Description | 9500 MPT-HLC FIXED MODULATION SP | 9500 MPT-HLC FIXED MODULATION SP |
| Emission Designator / Modulation | 30M0D7W        128 QAM | 30M0D7W        128 QAM |
| Loading | 1 CH   DIG 161000.000 | 1 CH DIG 161000.000 |
| Stability (%) | 0.001 | 0.001 |
| | Nominal  Coordinated  Maximum | Nominal  Coordinated  Maximum |
| Power (dBm) | 32.5 | 32.5 |
| Received Level (dBm) | -31.8 | -31.8 |
| EIRP (dBm) | 70.7 | 70.4 |
| Fixed Loss: Tx / Common (dB) | 0.0 / 7.4 | 0.0 / 7.7 |
| Free Space Loss (dB) | 140.4 | |
| Transmit Frequencies (MHz) | 6256.5400V(23T) | 6004.5000V(13T) |

FIG. 5

602 SITE NAME(NE ID): 3781-3217KLT   604 9500 MPR (MSS-1) CONFIGURATION   606
SITE LOCATION:                                                                   LATITUDE
                                                                                 LONGITUDE

| NETWORK CONFIGURATION | | | | SYSTEM CONFIGURATION | | SYNCHRONIZATION | | SNMP INFORMATION 608 | |
|---|---|---|---|---|---|---|---|---|---|
| Local IP | | | | DHCP | ENABLED | ROLE | MASTER | SNMP VERSION 2c: | |
| NTP | MAIN | | | ETHERNET LOS CRITERIA | DISABLED | RESTORATION | REVERTIVE | STRING, READ: | PUBLIC |
| | SPARE | | | STATIC LAG CRITERIA | DEFAULT | WAIT-TO-RESTORE TIME | 5 MIN | STRING, READ/WRITE: | PRIVATE |
| OSPF AREA | AREA ID | 0 | | SYSTEM PRIORITY PARAMETER | 32768 | PRIMARY SOURCE | SYNC-IN | SNMP V3, USM MGMT: | |
| | AREA ADDRESS | 0.0.0.0 | | AIS INSERTION FOR LOF DETECTION | ENABLED | SECONDARY SOURCE | INTERNAL | USER NAME | PASSWORD |
| | STUB FLAG | FALSE | | EVENT AND ALARM LOG | ENABLED | NOTES: | | | |
| IP STATIC ROUTING | NET ADDRESS | 0.0.0.0 | | MAC | | | | | ADMINISTRATOR PROFILE |
| | IP MASK | 0.0.0.0 | | SNMP | SNMPv3 | | | | |
| | GATEWAY | N/A | | ETHERNET RF RING TOPOLOGY ENABLED | No | | | | |

| TMN INTERFACE | | | | 610 |
|---|---|---|---|---|
| | TMN PORT (CRAFT) | PORT 4 TMN ETHERNET | IN-BAND 1 | IN-BAND 2 |
| IP ADDRESS | | | | |
| IP MASK | | | | |
| IP ROUTING PROTOCOL | OSPF | OSPF | | |
| OSPF AREA NO. OR STATIC ROUTE (AS APPLICABLE): | 0 | 0 | | |
| VLAN (IF APPLICABLE): | 1 | 1 | | |
| ASSOCIATED ETHERNET PORTS (IF APPLICABLE): | N/A | N/A | | |

| LEGACY RADIO RSL VALIDATION FORM ||||||||
|---|---|---|---|---|---|---|---|
| Site | |||||||
| To/From | |||||||
| Tester | |||||||
| Date | |||||||
| PRECHECK (before retermination) ||||||||
| TX Frequency | | | RX Frequency | | | | |
| Expected RSL (Engineered) | | | | | | | |
| (A) MAIN | (B) DIVERSITY | Description | Tolerance | (A) MAIN | (B) DIVERSITY | Initial ||
| -35.0 | -35.0 | AGC Voltage | VDC | 3.00 | 3.00 | ||
| | | RSL Check | +2 dB / -2 dB | -35.0 | -35.0 | ||
| PARALLEL (after retermination) ||||||||
| TX Frequency | 0 || RX Frequency | 0 ||||
| Expected RSL Calculated w/loss | | | | Actual | Actual | ||
| MAIN | DIVERSITY | Description | Tolerance | A | B | Initial ||
| -37.4 | -37.4 | AGC Voltage | VDC | 3.00 | 3.00 | ||
| | | RSL Check | +2 dB / -2 dB | -40.0 | -40.0 | ||
| | Near END | Branching Parts Estimated Loss in dB: || 1.2 | 1.2 |||
| | Far END | Branching Parts Estimated Loss in dB: || 1.2 | 1.2 |||
| | Total HOP | Branching Parts Estimated Loss in dB: || 2.4 | 2.4 |||
| NOTES: ||||||||
| | Company | | Name(s) | Date | Signature |||
| Originator | | | | | |||
| Customer | | | | | |||
| When the entry field is shaded ... | Then the field ... |||||||
| grey | requires entry. |||||||
| red | result is out of range. Contact project manager for guidance. |||||||
| green | result is within acceptable range |||||||

802 → (precheck section)
804 → (parallel section)

FIG. 9

Microwave Transmission Line Validation Sheet

This document is used during the transmission line installation phase to document that new or existing lines meet customer specifications for each Company microwave radio connected to it.

This document should be used in accordance with the directions on the following "Directions" tab.

Site:
Address:
Latitude:
Longitude:
To/From:
Date:
Tester: Richard Smith
Customer Site Ref #:
Customer P.O. Ref #:
TLVS Submitter: Richard Smith

|  | Type of Line | Install Status | Polarization | Radio TX on this line? |
|---|---|---|---|---|
| Main Transmission Line 1 | | | | |
| Color code | | | | |
| 2 | | | | |
| Color code | | | | |
| 3 | | | | |
| Color code | | | | |
| 4 | | | | |
| Color code | | | | |
| Space Diversity Line 1 | | | | |
| Color code | | | | |
| 2 | | | | |
| Color code | | | | |
| 3 | | | | |
| Color code | | | | |
| 4 | | | | |
| Color code | | | | |

Ed: 01.00

|  | Company | Name(s) | Date and signature(s) |
|---|---|---|---|
| Originator | Company | Richard Smith | |
| Approved By | < Customer > | < Customer representative > | < Date and signature(s)- Customer approves TDS > |

9500MPR
Microwave packet radio links
9500 MPR - Rel 6.1

Test Result Data Sheet

| Object : |
|---|

This document is used during the equipment commissioning and acceptance phases.
This document must be used according to the instructions given in the Line-up
and Commissioning Chapter of the corresponding 9500MPR User Manual:
9500 MPR R6.1.0 Documentation for ANSI
Edition 02

| Reference documents |
|---|

NOKIA 9500 MICROWAVE PACKET RADIO Turn-up Manual
Release 6.1.0 Edition 02

Link ID :   *BVCK-NRWY-1*
Site A User Label :   *BVCK*
Site B User Label :   *NRWY-1*
          Date :   *2/16/2018*

| Status |
|---|

[X] Creation
[ ] Extension

| Version date : 09/20/2016 | | | |
|---|---|---|---|
| Version number : 02 | | | Ref. ED02 |
| | Company | Name(s) | Date and signature(s) |
| | | | |
| Originator | | *Richard Smith* | *2/16/2018*    *RKS* |
| Appraisal | | | |

ED02        Test Result Sheet for Site Acceptance Test Procedure of 9500MPR

FIG. 10

9500 MPR (MSS-1) CONFIGURATION

1102 SITE NAME (NE ID):
SITE LOCATION:

1104 — NETWORK CONFIGURATION

| NETWORK CONFIGURATION | | |
|---|---|---|
| Local IP | | |
| NTP | MAIN | |
| | SPARE | |
| OSPF AREA | AREA ID | |
| | AREA ADDRESS | |
| | STUB FLAG | |
| IP STATIC ROUTING | NET ADDRESS | |
| | IP MASK | |
| | GATEWAY | |

1104 — SYSTEM CONFIGURATION

| SYSTEM CONFIGURATION | |
|---|---|
| DHCP | |
| ETHERNET LOS CRITERIA | |
| STATIC LAG CRITERIA | |
| SYSTEM PRIORITY PARAMETER | |
| AIS INSERTION FOR LOF DETECTION | |
| EVENT AND ALARM LOG | |
| MAC | |
| SNMP | |
| ETHERNET RF RING TOPOLOGY ENABLED | |

1106 — SYNCHRONIZATION    LATITUDE    LONGITUDE

| SYNCHRONIZATION | |
|---|---|
| ROLE | |
| RESTORATION | |
| WAIT-TO-RESTORE TIME | |
| PRIMARY SOURCE | |
| SECONDARY SOURCE | |
| NOTES: | |

1108 — SNMP INFORMATION

| SNMP INFORMATION | | |
|---|---|---|
| SNMP VERSION 2c: | STRING, READ: | |
| | STRING, READ/WRITE: | |
| SNMP V3, USM MGMT: | USER NAME | PASSWORD | PROFILE |

TMN INTERFACE

| TMN PORT (CRAFT) | PORT 4 TMN ETHERNET | IN-BAND 1 | IN-BAND 2 |
|---|---|---|---|
| IP ADDRESS | | | |
| IP MASK | | | |
| IP ROUTING PROTOCOL | | | |
| OSPF AREA NO. OR STATIC ROUTE (AS APPLICABLE): | | | |
| VLAN (IF APPLICABLE): | | | |
| ASSOCIATED ETHERNET PORTS (IF APPLICABLE): | | | |

| PARAMETER | | | ETHERNET PORTS | | | | | |
|---|---|---|---|---|---|---|---|---|
| | | | 3.1 | 3.2 | 3.3 | 3.8 | ... | 4.8 |
| STATUS | | | | | | | | |
| USER LABEL (15 CHARACTERS) | | | | | | | | |
| AUTO NEGOTIATION STATUS | | | | | | | | |
| FLOW CONTROL | | | | | | | | |
| ADVERTISED CAPABILITY | 10 HALF DUPLEX | | | | | | | |
| | 10 FULL DUPLEX | | | | | | | |
| | 100 HALF DUPLEX | | | | | | | |
| | 100 FULL DUPLEX | | | | | | | |
| | 1000 FULL DUPLEX | | | | | | | |
| VLAN | TYPE | | | | | | | |
| | PORT VLAN ID | | | | | | | |
| | PRIORITY | | | | | | | |
| SYNC. MODE | | | | | | | | |
| SYNC-E | | | | | | | | |
| SSM | | | | | | | | |
| PORT IN LAG (Y/N) | | | | | | | | |
| PORT IN R-RING | | | | | | | | |
| ETHERNET RATE LIMIT | | | | | | | | |
| ETHERNET STORM CONT | | | | | | | | |
| VLAN RATE LIMIT | | | | | | | | |
| VLAN-COS RATE LIMIT | | | | | | | | |
| ETHERNET LINK OAM-STATUS | | | | | | | | |

| 9500 MPR (MSS-8) CONFIGURATION | | Radio Port Configuration | | Site: | | | | |
|---|---|---|---|---|---|---|---|---|
| RADIO PORTS | | | | | | | | |
| PARAMETER | | 3.5 | 4.5 | 3.6/4.6 | 3.7 | 4.7 | 5.5/6.5 | |
| USER LABEL | | | | | | | | |
| STATUS | | | | | | | | |
| EPS | | | | | | | | |
| RPS | | | | | | | | |
| TPS | | | | | | | | |
| RF ENCRYPT LIC | | | | | | | | |
| RF ENCRYPT INTEGRATED | | | | | | | | |
| FREQUENCY | CH SPACING | | | | | | | |
| | SHIFTER | | | | | | | |
| | TX FREQUENCY | | | | | | | |
| | RX FREQUENCY | | | | | | | |
| MODULATION - FIXED/ACM | | | | | | | | |
| REF MODULATION | | | | | | | | |
| REF MOD TX POWER [dBm] | | | | | | | | |
| ENABLED MODULATIONS | | | | | | | | |
| POLARITY | | | | | | | | |
| TARGET RSL [dBm] | | | | | | | | |
| MAX THROUGHPUT [Mbps] | | | | | | | | |
| XPIC (IF APPLICABLE) | STD / XPIC | | | | | | | |
| | XPIC POL: | | | | | | | |
| | ASSOCIATED I/F: | | | | | | | |
| ATPC (IF APPLICABLE) | STATUS | | | | | | | |
| | REQUESTOR | | | | | | | |
| | NOMINAL | | | | | | | |
| | COORDINATED | | | | | | | |
| | MAXIMUM | | | | | | | |
| | TRIGGER THRESHOLD | | | | | | | |
| RF PPP (ENABLED/DISABLED) | | | | | | | | |
| ROUTING IP PROTOCOL (OSPF/NONE) | | | | | | | | |
| OSPF AREA | | | | | | | | |
| SYNCHRONIZATION, SSM | | | | | | | | |
| LINK IDENTIFIER | STATUS | | | | | | | |
| | EXPECTED ID | | | | | | | |
| | SENT ID | | | | | | | |

SYSTEM AND METHOD FOR MANAGING AND PRESENTING NETWORK DATA

TECHNICAL FIELD

The present invention relates to data management systems, and more particularly for a system and method for storing and presenting data associated with a network.

BACKGROUND

Communications and data networks comprise complex systems including a large number of hardware components having a vast number of wireless and hardwired connections between the various hardware components. Any time a communications or data network is set up there is a large amount of data that must be managed with respect to the network. Documentation describing the configuration and connections of the various hardware components must be created to enable maintenance and control of the network components. Also, while initially configuring the network hardware components confirmation of appropriate configuration of these components must be established in order to ensure that the network is operating correctly. There are also a number of labeling requirements for the various hardwired connections and server back planes that must be provided in order to enable technicians to work on and locate particular connections within the network.

Existing protocols require system installers to manually generate all of the documentation and labeling requirements necessary for a network system. Additionally, when configuring the network an individual is required to manually locate configuration information from various sources and compare the information in order to ensure that a system hardware component has been configured appropriately. All of these tasks require a huge number of man-hours and are susceptible to human error due to the vast amount of information that must be manually checked. Thus, some manner for more efficiently and quickly managing and presenting vast amounts of data associated with wireless communication network would be greatly beneficial to both system installers and customers requiring accurate up-to-date documentation.

SUMMARY

The present invention, as disclosed and described herein, in one aspect thereof comprises a method for managing network parameter data includes selecting an input source of a plurality of input source types. At least a portion of the selected input source comprising predetermined network parameter data in a first format is accessed. The portion of the selected input source containing the predetermined network parameter data in the first format is harvested and the predetermined network parameter data in the harvested portion of the selected input source is extracted. The extracted predetermined network parameter data in the first format is converted into a second format and stored within a data array. An output format of a predetermined plurality of output formats for the predetermined network parameter data is selected and the predetermined network parameter data is generated in the selected output format from the stored predetermined network data within the data array. The generated predetermined network data is then output in the selected output format.

BRIEF DESCRIPTION OF THE DRAWINGS

For a more complete understanding, reference is now made to the following description taken in conjunction with the accompanying Drawings in which:

FIG. 4 illustrates a path calculation datasheet;

FIG. 5 illustrates a microwave path datasheet;

FIG. 6 illustrates a device configuration table;

FIG. 8 illustrates a Legacy Radio RSL Validation Form;

FIG. 9 illustrates a microwave transmission line validation sheet;

FIG. 10 illustrates a test results datasheet;

FIG. 11 illustrates a 9500 MPR (MSS-1) configuration sheet;

FIG. 12 illustrates an Ethernet port configuration template;

FIG. 14 illustrates a radio port configuration;

DETAILED DESCRIPTION

Figure 1:
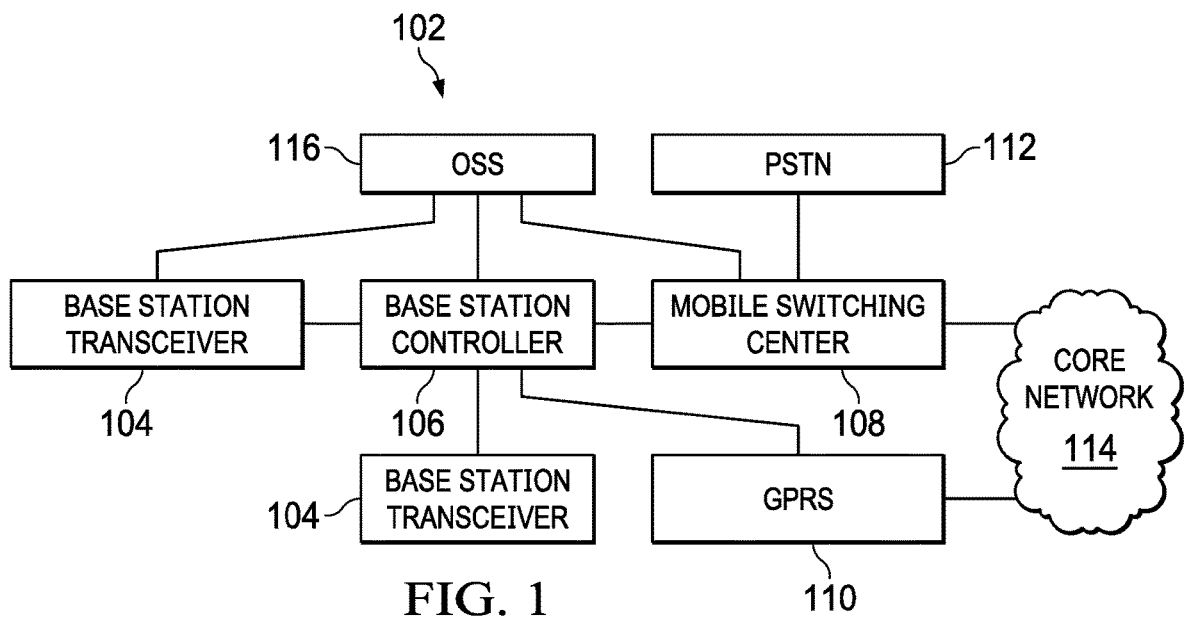
FIG. 1 illustrates a GSM wireless communications network.

Referring now to the drawings, wherein like reference numbers are used herein to designate like elements throughout, the various views and embodiments of a system and method for managing and presenting network data are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

FIG. 1 illustrates a GSM wireless communications network which would utilize the system and method described herein. The GSM wireless communications network 102 comprises a number of system components that each include configuration data, connection data, port data, etc. that may be utilized in various manners. A number of base station transceivers (BTS) 104 provide for a wireless communication interface with various mobile devices and user equipment communicating through the GSM network. The BTS 104 comprises radio transmitter receivers and their associated antennas to transmit and receive to provide communications with wireless mobile devices. The BTS 104 communicates with the mobile devices using the Um interface with its associated protocols. Each BTS 104 is an communication with and controlled by a base station controller (BSC) 106. The BSC 106 controls a group of BTSs 104 and is often co-located with one of the BTSs in the group. The BSC 106 manages radio resources and controls items such as handover within the group of BTSs 104, allocates channels and the like. The BSC 106 communicates with the BTSs 104 over the Abis interface. The BTS 104 and BSC 106 together comprise the base station subsystem (BSS).

The base station controller 106 communicates with the mobile switching center (MSC) 108 and the general packet radio service (GPRS) circuitry 110. The MSC 108 acts like a normal switching node within a PSTN or ISDN, but also provides additional functionality to enable the requirements of a mobile user to be supported. These functionalities include registration, authentication, call location, inter--MSC handovers and call routing to a mobile subscriber. The MSC 108 also provides an interface to the PSTN (public switched telephone network) 112 so that calls can be routed from the mobile network to a phone connected to a landline. The GPRS circuitry 110 enables mobile networks to transmit IP packets to external networks such as the Internet. Each of the mobile switching center 108 and GPRS circuitry 110 are further connected to the core network 114 that provides network service provider connections to various other network resources.

The operation support system (OSS) 116 provides for network maintenance and communicates with the base station transceivers 104, base station controller 106 and mobile switching center 108. The OSS 116 is used to control and monitor the overall GSM network and is also used to control traffic load of the BSS. The OSS 116 enables network providers to control the network and provide management functions such as network inventory, service provisioning, network configuration and fault management.

Each of the above described system components have a variety of information associated there with that is stored in a variety of disparate locations that make the information difficult to utilize and manage. The creation of documentation with respect to a GSM system or any network provides a number of challenges due to the level of detail and amount of information that must be processed. While the above description has referenced a GSM system, the below described system may be utilized with any network having a variety of data needed to be processed and managed and alternatively could be utilized with respect to any hardware intensive system that has associated there with a large amount of information that must be efficiently processed and managed with respect to documentation, labeling and other data management requirements.

Figure 2:
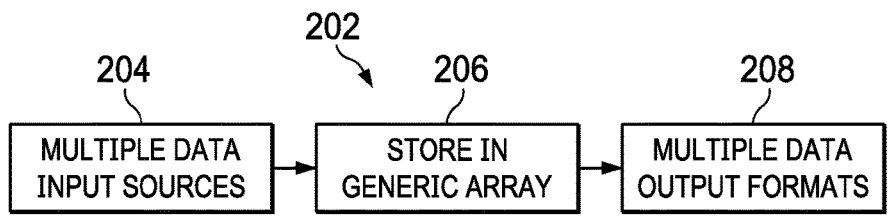
FIG. 2 illustrates a general block diagram of a data management and processing system.

FIG. 2 illustrates a general block of the data management and processing system 202. The system 202 receives information from multiple data input sources 204. The multiple input data sources 204 such as PDF, text, XLS and others are processed as will be described herein and stored within a generic array database 206. The stored generic data within the generic array 206 may then be utilized in a variety of fashions to generate multiple data output formats 208 such as PDF, text, XLS and others depending upon the needs of the user. In this manner, data can be more efficiently processed by managing and configuring the multiple data input sources 204 into a single unified generic array 206. The information within the generic array 206 may be accessed in a controlled manner to generate a desired data output format from the available number of multiple data output formats 208 accessible via a number of predetermined databases or user established formats.

Figure 3:
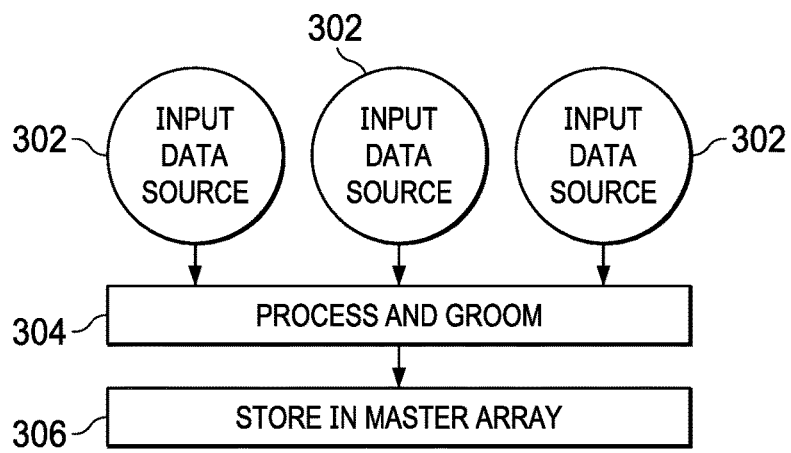
FIG. 3 illustrates a first stage of a data management and processing system.

FIG. 3 more particularly illustrates the first stage of the data management and processing system 202. As mentioned, the system 202 can access a variety of input data sources 302. The input data source 302 may comprise any number of data source types enabling the system 202 to access and utilize a variety of different data types. The data sources 302 may be in any number of formats. Referring now to FIGS. 4-6, there are illustrated three different types of data sources that may be utilized for obtaining information for storage within a generic array 206. FIG. 4 illustrates a path calculation datasheet that provides a variety of information about an antenna and its associated radio transmission equipment. The path calculation datasheet represents a variety of information with respect to antenna and radio equipment parameters any of which may be extracted for storage within the database 206 as described hereinbelow. FIG. 5 illustrates a microwave path datasheet that provides a variety of information with respect to a microwave transceiver. The information comprises administrative information, site information, transmit antenna information, receive antenna information, diversity receive antenna information and radio transceiver information along with system transmission frequencies. Each of these pieces of information may be extracted and stored within a generic database 206 for generation of output files as will be described. A device configuration table is illustrated with respect to FIG. 6. The table includes network configuration information 602, system configuration information 604, synchronization information 606, SNMP information 608 and TDM and interface information 610. While FIGS. 4-6 illustrate a number of different types of input data source files 302 that may be accessed by the system, any data source including information that may be utilized to extract necessary information for storage within the generic database 206 may be utilized.

The data contained within the plurality of input data sources 302 are processed and groomed at 304 to extract the desired information from each of the data sources 302. The extracted information can comprise some or all of the information contained within the input data sources 302 that are located at known positions or locations within the data files enabling the information to be extracted from a plurality of files and stored within a master generic data array 306. In this manner, necessary data may be extracted from disparate unrelated data sources 302 and relevant information extracted at step 304 to store in a generically usable master array at 306 such that the data can be used in a variety of fashions and output formats.

Figure 7:
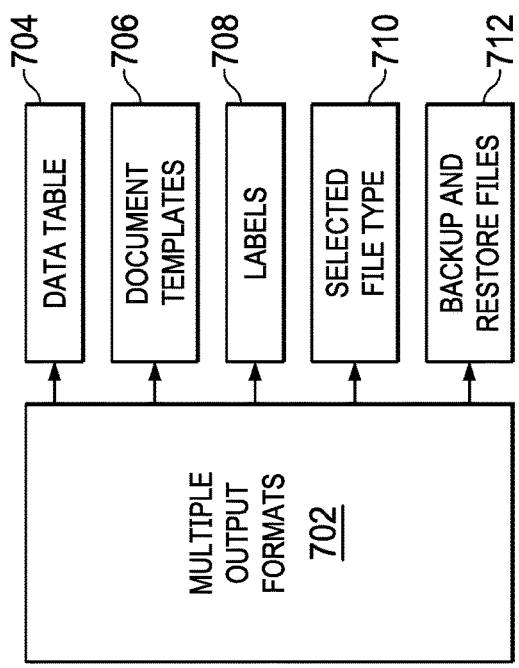
FIG. 7 illustrates the various output formats of the data management and processing system.

Information stored within the generic data array 206 may be provided in multiple, user designated output formats 702 as illustrated in FIG. 7. The multiple output formats 702 may include a data table 704, document template 706, labels 708, selected file type 710, backup and restore files 712 or any other output format which may be useful to a user. A data table 704 comprises a listing of related network configuration data associated with network equipment that may be visually inspected in the data table format 704 to enable an individual to locate mistakes within the information represented by the data table 704. By placing the information in the data table format 704, a reviewer may more easily detect errors caused by incorrect information. A document template 706 may be utilized for the preparation of required system documentation associated with a wireless network. Part of the deliverable requirements associated with setting up a network configuration for a network are the provision of system documentation in a particular format that defines relevant system information for the customer. This information must often be presented in a predefined document template that can be automatically filled out using the present system. An example of a document template is illustrated in FIG. 8. FIG. 8 illustrates a Legacy Radio RSL Validation Form. The Legacy Radio RSL Validation Form provides with respect to a particular transceiver site precheck information 802 relating to system information prior to retermination and parallel information 804 determined after retermination. Each of the data fields may be populated from the generic array 206 in order to accurately create system documentation. Another template is illustrated in FIG. 9, wherein there is illustrated a microwave transmission line validation sheet. The template provides documentation for information with respect to the microwave transmission sites at a particular location.

Figure 13:
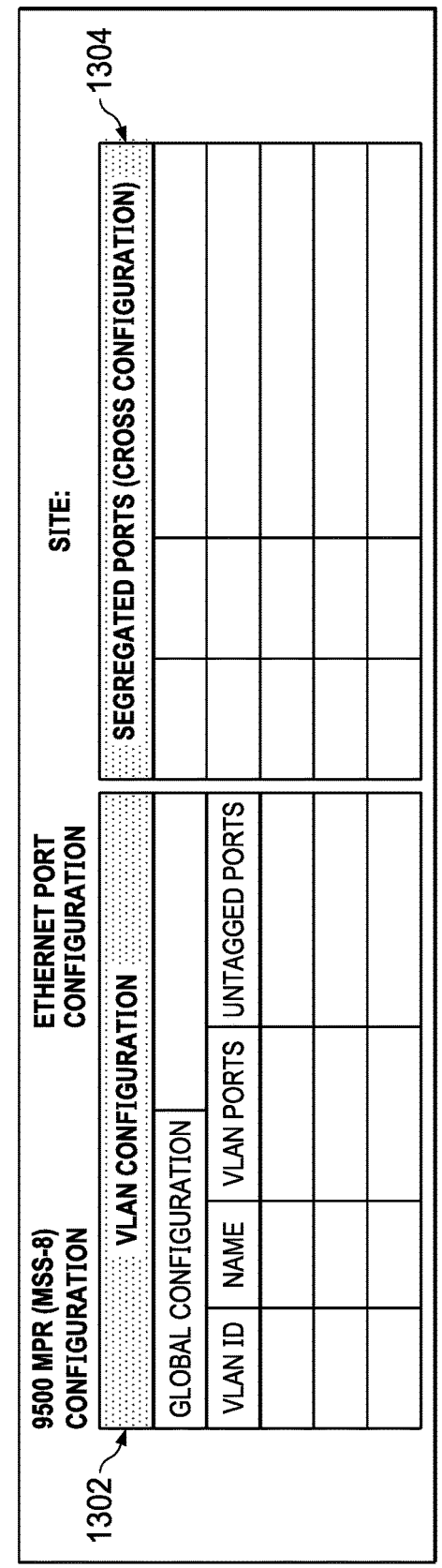
FIG. 13 illustrates a second Ethernet port configuration template.

Further examples of templates are illustrated in FIGS. 10-14. FIG. 10 illustrates a test results datasheet. The test results datasheet is used in the equipment machining and acceptance phases. FIG. 11 illustrates the 9500 MPR (MSS-1) configuration sheet. The template illustrates all configuration information with respect to network configuration 1102, system configuration 1104, synchronization information, SNMP information and TMN interface information. FIG. 12 illustrates an Ethernet port configuration template for the 9500 MPR (MSS-8) configuration. The template provides a variety of configuration information with respect to the ethernet ports. FIG. 13 illustrates an Ethernet port configuration template for the 9500 MPR (MSS-8) configuration. The template provides a variety of configuration information with respect to the VLAN configuration 1302 and segregated ports (cross configuration) 1304. FIG. 14 illustrates the radio port configuration for the 9500 MPR (MSS-8) configuration.

System labels 708 may be generated as another output format 7024 for labeling system wiring/cabling and equipment connections and designations. The establishment of any network requires a number of connections and system components that must be labeled in order to enable technicians to later perform maintenance on the system. The automatic creation of the labels that may be placed upon the system hardware provides a great benefit to both the system installers and customers of the system for speeding the delivery process. Selected file type 710 may comprise any file type that may be selectively configured by the user to provide desired system information. In this manner, unique output file configurations may be established by the user according to a defined configuration in order to provide necessary system information. Another output file format comprises backup and restore files 712. Backup and restore files 712 may be used for backing up system hardware component software and for restoring software on these components after system failures.

Figure 15:
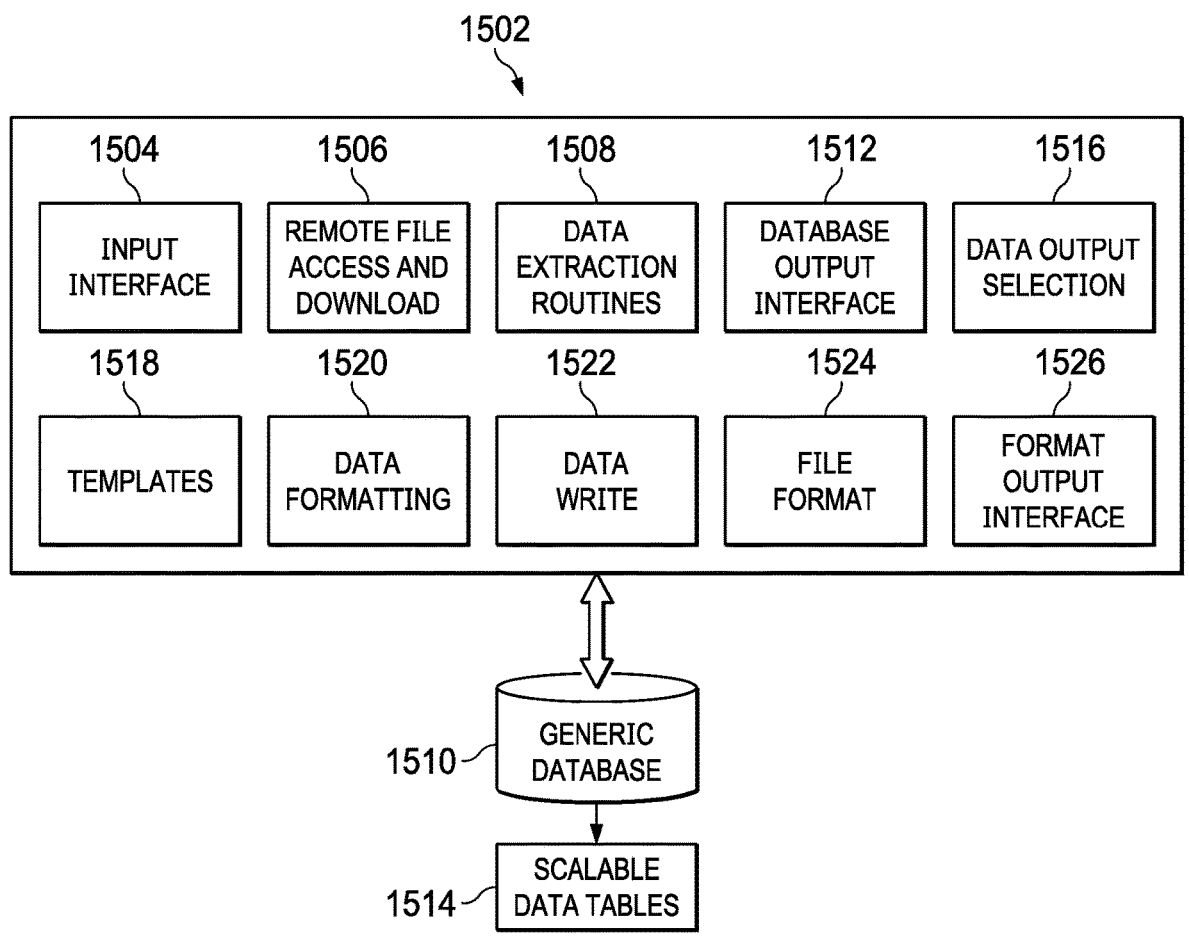
FIG. 15 illustrates a functional block diagram of a system for providing management and presentation of network data.

Referring now to FIG. 15, there is illustrated a functional block diagram of the system for providing management and presentation of network data 1502. The system 1502 includes an input interface 1504 for accessing the various types of source data files described hereinabove. The remote file access and download controller 1506 enables the system 1502 to access the various types of files including the data upon which the system may manage and present. The controller 1506 in addition to accessing various types of remote data files may also access data directly from a live system and skip the process of accessing and downloading hardcopy files. The data extraction routine controller 1508 is responsible for accessing data contained within the downloaded file formats in order to extract particular data portions that may be downloaded into a generic database 1510. The extracted data entries from the access files are output via a database output interface 1512 for storage within an accessible location within the generic database 1510. The generic database 1510 includes a number of scalable data tables 1514, the data tables including locations for storing the extracted data provided via database output interface 1512.

Once data has been stored within the scalable tables 1514 of the generic database 1510, information within the database may be utilized in the number of fashions and output formats. Selection of the manner of data output from the generic database 1510 is made using a data output selection controller 1516. The data output selection controller 1516 selects the manner for output of the data using an existing preformatted template, a converted file format, a data viewing format, a user specified data format or any other number of selectable output formats. The data output selection controller 1516 may work in conjunction with the templates controller 1518 for providing access to previously created templates into which data from the scalable data tables 1514 of the generic database 1510 may be inserted based upon data access queries generated responsive to a selected template. The data formatting controller 1520 enables selection of a particular data format for outputting of the data accessed from the scalable data tables 1514 of the generic database 1510. The data formatting controller 1520 places selected data in a table readable format useful for confirming the accuracy of data contained within the generated table readable format. The data write controller 1522 may be used for writing data to a label fillable format such that the information may be printed upon a label template such that the labels may then be placed upon the system hardware equipment and cables. The file format controller 1524 enables files that have been out loaded by the remote file access and download controller 1506 to be converted from the downloaded file format into another file format that may be utilized for differing purposes. Output formats that are accessed from the generic database 1510 are output from the system 1502 via the format output interface 1526. The output interface 1526 may provide the access data in any configuration necessary depending upon the needs that the destination source of the information requires.

The generic database 1510 and the associated scalable data tables 1514 store information based upon a hardware site location name with each hardware site name having a plurality of pieces of information associated there with. Examples of the information that may be associated with the site name include, but is not limited to: site number, site location, latitude, longitude, bridge MAC address, SNMP version, IP stack version, transceiver and prot type, restoration EPS, restoration RPS, restoration TPS, TMN RF management, OSPF area number, channel spacing (MHz), modulation (QAM), capacity (Mbps), shifter (MHz), TX frequency (MHz), RX frequency (MHz), TPC enabled, minimum TX power (dBm), Max TX power (dBm), RX threshold (dBm), radio SSM enabled, PKT booster enabled, encryption enabled, queue sizes/channel #, key/LAG name, MPT in RING, radio label, XPIC polarization, combiner status, TDA status, radio position in rack, channel polarity, Far end site number: name, frequency band, slots/port X.X, PCN-main RSL: RX thresh, optical SFP enabled, auto negotiation, bit rate (Mbps), duplex capability, flow control, sync mode, acceptable frame type, optical SSM, ethernet label enabled, transceiver and prot type, restoration EPS, restoration RPS, restoration TPS, TMN RF management, OSPF area number, channel spacing (MHz), modulation (QAM), capacity (mbps), shifter (MHz), transmit frequency (MHz), RX frequency (MHz), ATPC enabled, min TX power (dBm), radio SSM enabled, PKT booster enabled, encryption enabled, queue sizes/channel #, key/LAG name, MPT in RING, radio label, XPIC polarization, combiner, TDA status, radio position in rack, channel polarity, Farend Site Number, frequency band, slots/port X.X, PCN-main RSL: RX thresh, optical SFP enabled, negotiation, bit rate (Mbps), duplex capability, flow control, sync mode, acceptable frame type, optical SSM enabled, ethernet label, card type slot 1, card type slot 2, card type slot 3, card type slot 4, card type slot 5, card type slot 6, card types 7, card type slot 8, OSPF area address, NTP config. enabled, NTP main server IP, NTP spare server IP, DHCP enabled, local IP address/TMN Port 4/224, TMN ethernet enabled, TMN IP address, TMN network mask, TMN OSPF area, VLAN bridge type, segregation of ports, sync role, sync source, primary source, secondary source, SSM wait to restore, QOS, active bank: 1-2 compare, space diversity, PATH CALC-path length. This list is not intended to be exhaustive and other types of information could be stored within the generic database to enable access and use by the system.

Figure 16:
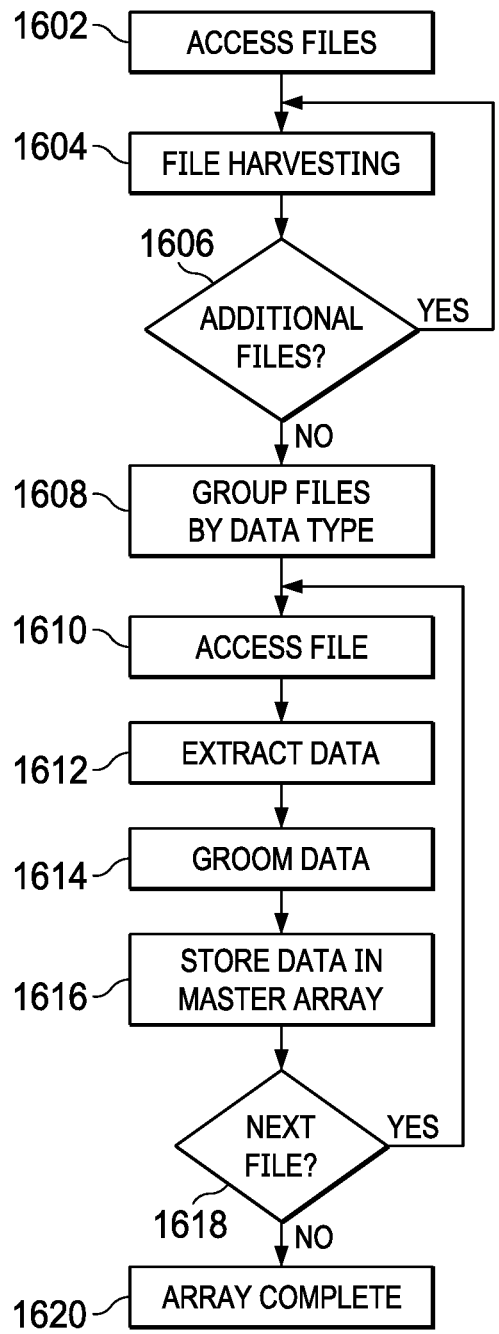
FIG. 16 illustrates a flow diagram of the process for establishing a generic database.
Figure 17:
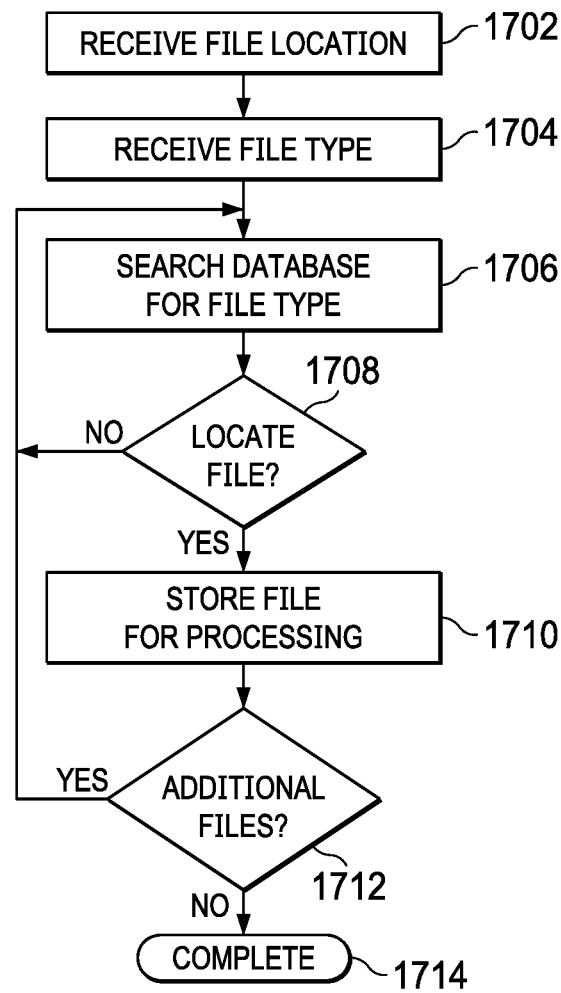
FIG. 17 illustrates a flow diagram of a file harvesting process.

Referring now to FIG. 16, there is illustrated a flow diagram of the process for establishing the generic database 1510 including the scalable data tables 1514 described with respect to FIG. 15. The input data files containing relevant data to be processed by the system 1502 are accessed at step 1602 through the input interface 1504 using the remote file access and download controller 1506. The accessed data files are processed using file harvesting techniques at step 1604 that is under the control of the remote file access and download controller 1506. FIG. 17 provides a flow diagram illustrating one manner of file harvesting. The file location associated with a particular file is received at step 1702. An indication of the file type to be downloaded is received at step 1704. Based upon the received file location and the type of file to be searched for, the database containing the files is searched at step 1706 for the indicated file type. Inquiry step 1708 determines if a file of this type can be located within the database and the file is stored at step 1710 for later processing. If no file is initially located, the search process continues at step 1706. Inquiry step 1712 determines if there are additional files available for searching within the database and if so, control passes back to step 1706 to search for the indicated file type. Once all files of this type have been located within the database, the process is completed at step 1714 and no further files are available for harvesting.

Returning now back to FIG. 16, once files have begun to be harvested at step 1604, inquiry step 1606 determines if there are additional files available for harvesting in accordance with the routine discussed with respect to FIG. 17. If so, the file harvesting process continues at step 1604. Once all of the files have been harvested, the files are grouped together by the data types they contain at step 1608. The data files may then be accessed at step 1610 and any relevant data extracted therefrom at step 1612 using the data extraction routines controller 1508. The extracted data may be located in any number of fashions such as known locations or data fields within the accessed data files. First and second embodiments for extracting the data are more fully described herein below with respect to FIGS. 18 and 19. The extracted data is groomed at step 1614 to place it in a format consistent with storage in the master data array 1514. The most common process that is carried out when grooming is done upon the data is to remove all unwanted characters or correct for proper case (for example, all caps, etc.). In some instances intuitive information may be encoded into a particular string. For example, a user identified name/label may be programmed into a piece of equipment by a technician, such as: 1V3-2204 Preston—where the first digit indicates rack number one, the second digit indicates a vertical polarity with the, the third digit indicates equipment position in rack one and the remainder is the far end sight number and name. This information can be used to print and produce equipment labels. The groomed data is stored within the master data array at step 1616. Inquiry step 1618 determines if a next file is available and if so passes to step 1610 to access that file and begin the data extraction, grooming and storage process. Once all of the data files have been accessed, the array including the data is complete at step 1620.

Figure 18:
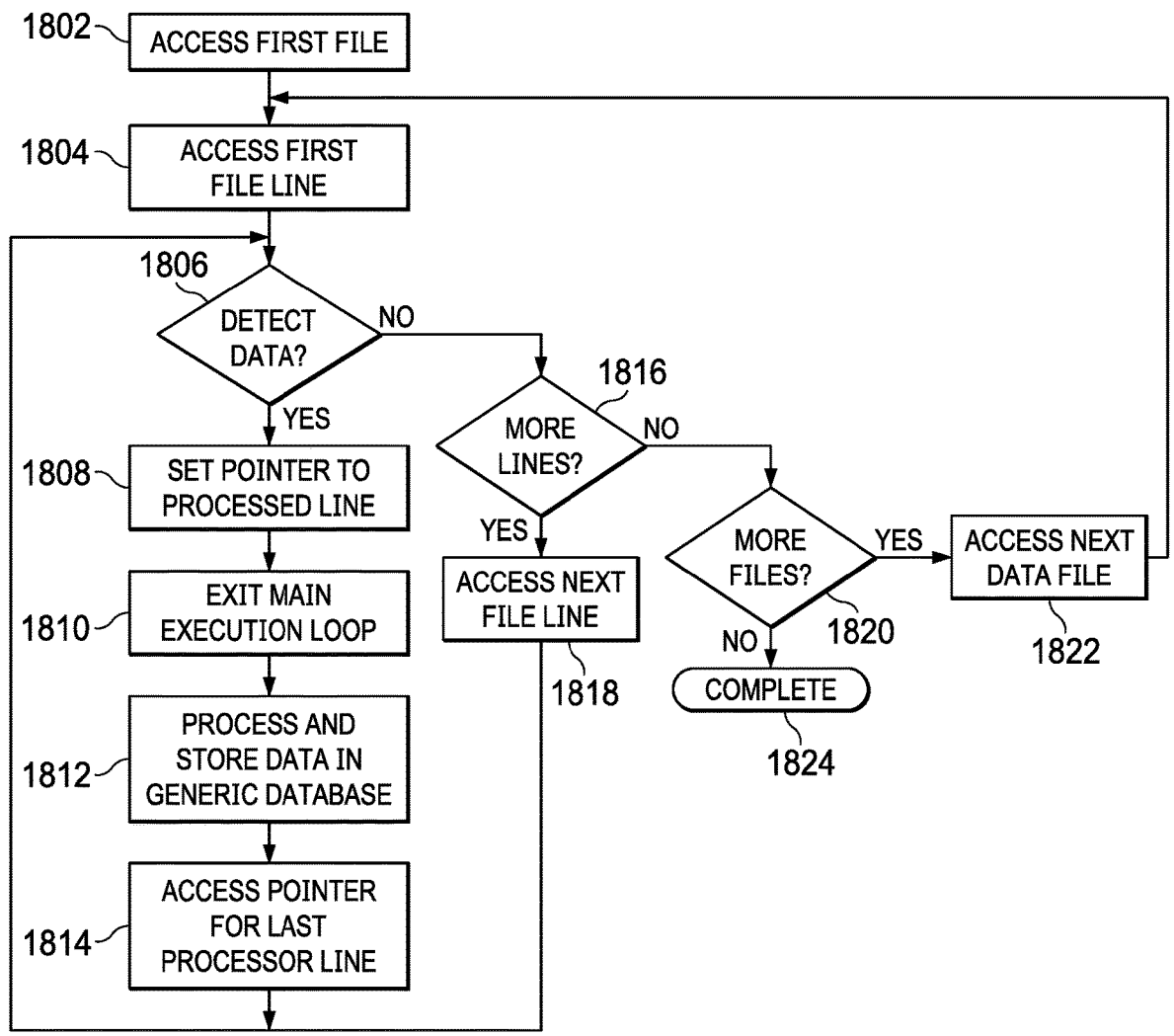
FIG. 18 illustrates a first embodiment for extracting data from data files.

FIG. 18 illustrates a first embodiment for extracting data from data files. This first embodiment, referred to as a Main Execution Loop runs each file individually through an execution loop that picks off data in a sequential/linear fashion as the process increments through each line consecutively. A first file within the group of accessed data files is accessed at step 1802. Within the first file, a first file line is accessed at step 1804. Inquiry step 1806 determines if relevant data is detected within the accessed line. If relevant data is detected, a pointer is set to point to the last processed line at step 1808 and the main execution loop is temporarily exited at step 1810 to process the detected data.

The detected data is processed and stored at step 1812 within the generic database. The pointer that was previously set at step 1808 is accessed at step 1814 to determine the last processed line within the data file. Control passes back to inquiry step 1806 to determine if additional relevant data is contained within the accessed file line. If further data is not detected at inquiry step 1806 or no data was detected during the first pass through, control passes to inquiry step 1816 to determine if additional lines exist within the accessed file. If additional lines are determined to exist, the next file line is accessed at step 1818 and control passes back to inquiry step 1806 for the detection of any relevant data within newly accessed file line.

If inquiry step 1816 determines no further lines are available for the currently accessed file, control passes to inquiry step 1820 to determine if additional files exist to be processed within the group of accessed files. If additional files are determined to exist, control passes to step 1822 to access the next available file. Control will pass to step 1804 to access the first file line of the newly accessed file and begin data detection therein. If no further files are detected at inquiry step 1820, the process is determined to be completed at step 1824.

Figure 19:
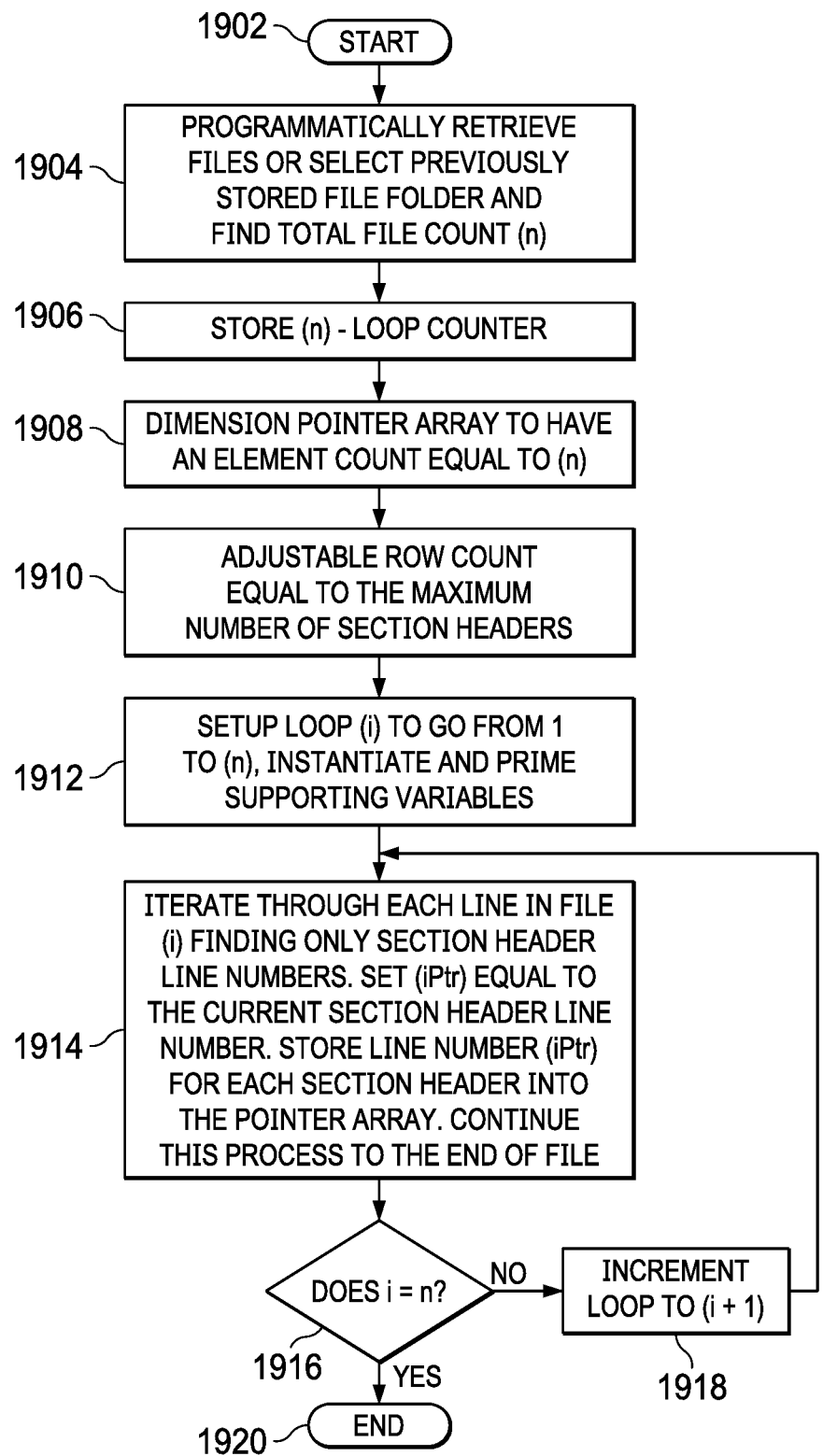
FIG. 19 illustrates a second embodiment for extracting data from data files.

FIG. 19 illustrates a second embodiment for extracting data from data files. The second embodiment, referred to as the Seek Method provides a process that iterates through each of the file group headers as a preliminary measure to load an array of pointers. Each file has its own list of pointers held in an array that identifies a line item location for each group header of each file specifically. This provides the flexibility to know the start line and stop line for each group header, where the stop line is the next group line header −1. The group header line numbers are not fixed locations from one file to the next, the file counts move around from one file to the next based on the configuration differences from one piece of equipment to the next. Establishing the group header line numbers enables the process to pass in the start and stop line numbers into hardcoded functions that will yield the correct result every time without too much concern provided the correct line numbers are provided to the function. The process allows for cleaner code development and direct access to any data in any file basically on-the-fly.

As shown in FIG. 19, the process is initiated at step 1902. Initially, the files to be accessed are programmatically retrieved or previously stored file folders may be selected to determine a total file count (n) at step 1904. The total file count is stored within a loop counter at step 1906. Next, a dimension array pointer is set equal to the total file count at step 1908 and an adjustable row count is set equal to the maximum number of section headers at step 1910. A loop is set up at step 1912 to go from 1 to the total file count (n) and to instantiate and prime supporting variables. To instantiate a variable or an object, creates the initial first instance of the key variables or objects (structures) in memory. Then to prime a variable or an object involves assigning initial values to variables or to preset attributes of objects in memory. It could also be referred to by phrases such as Initialization or Initialization Process. When initially launching an application or running code it is always necessary to Instantiate Variables and Objects. However, to Prime Variables isn't usually as critical on the first pass due to the fact that initial variable values are typically 0, Empty or Null. But, if a second or third batch of files are to be processed, it is an important step to be certain residual values have all been cleared out and everything is setup and ready to process a new batch of files.

Next, at step 1914, the process iterates through each line in a currently accessed file to locate only section header line numbers, to set pointer (iPtr) equal to the current section header line number, and to store line number (iPtr) for each section header within the pointer array. This process continues for each line in the file until the end of the file. Inquiry step 1916 determines if the currently accessed file equals the last file within the group of files and if not, increments at step 1918 to access the next file within the group of files. If inquiry step 1916 determines the last file has been accessed, the process is ended at step 1920. As mentioned, establishing the group header line numbers enables the process to pass in the start and stop line numbers into hardcoded functions that will yield the correct result every time without too much concern provided the correct line numbers are provided to the function.

The Seek Method provides more flexibility and freedom to access any or all sections of the files being processed on an as needed basis. For example if only particular details within a file were of interest that fall under a specific section header, the process can simply make a call to the function that is used to extract the details that fall under a specific section header rather than searching through all of the section headers within a file.

When accessing this process the line pointer (iPtr) for a specific section header is passed in along with the next section header line number (−1). This provides the line numbers start and stop boundaries that are needed to process only the lines under any given section header for each file. Thus, $i$Ptr=PointerArray(SectionHeader,FileNumber)

$i$Start=$i$Ptr $i$Ptr=PointerArray(SectionHeader+1,FileNumber)

$i$Stop=$i$Ptr−1

The section header line numbers are moving around a lot from one file to the next, so the initial process of nailing down the section header line numbers and storing them within the pointer array makes it much simpler to repeatedly access data as needed. It is then just a matter of incrementing or looping to the individual file numbers for any given header to extract particular information. The Seek Method also lends itself well to more of an object oriented approach to code development as opposed to a large execution loop that has to iterate through every detail in every file to produce the final output.

Figure 20:
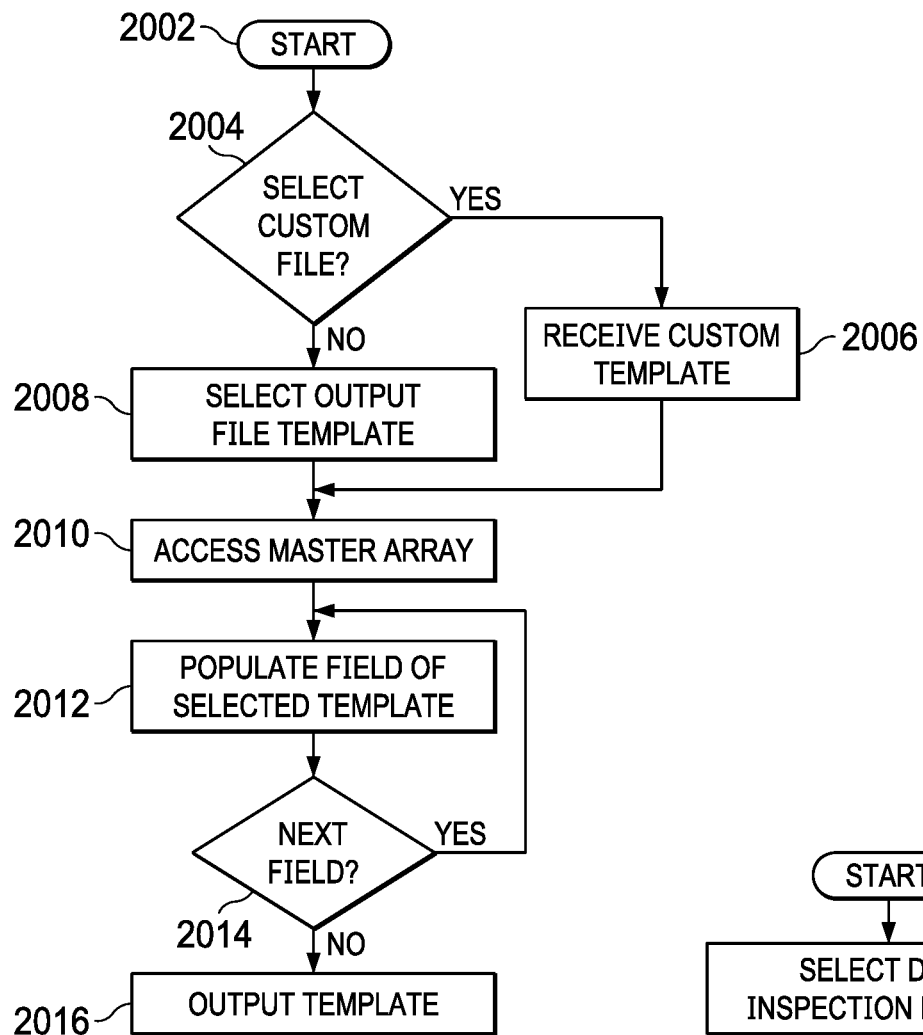
FIG. 20 illustrates a flow diagram of the process for accessing the generic database to produce a variety of different output formats.

Once all of the data has been stored within the scalable data tables 1514 of the generic database 1510, the data may be accessed and utilized for a variety of different task in a variety of different output formats as described previously. Referring now to FIG. 20, the process is initiated at step 2002 and inquiry step 2004 determines if a custom file template has been selected for population by the generic database 1510. If a custom file template has been selected, the custom template is downloaded or received at step 2006 using the template controller 1518 so that it can be populated with data from the generic database 1510. The generic master database 1510 is accessed by the template controller 1518 to populate the custom template at step 2010 to begin the template population process. If a custom file template is not selected at inquiry step 2004, a pre-created output file template may be selected at step 2008 using the data output selection controller 1516. The master data array 1510 is accessed at step 2010 to begin population of the pre-created template. Access to the master array at step 2010 is used to populate a first data field of the selected template at step 2012. Once the first data field has been selected, inquiry step 2014 determines if a next data field for population is present. If so, control passes back to step 2012 to populate the next data field from information stored within the generic database 1510. Once each of the data fields within the selected template have been populated and no further data fields are available, the populated template is output at step 2016. These types of preformed output templates may be used for the creation of delivery documentation that is associated with wireless communication network hardware configuration installations. Large-scale network hardware installations have large documentation requirements as part of the final delivery process. The creation of these documents may be achieved using preformed templates that have the ability to access the generic database to provide a more accurate documentation creation.

Figure 21:
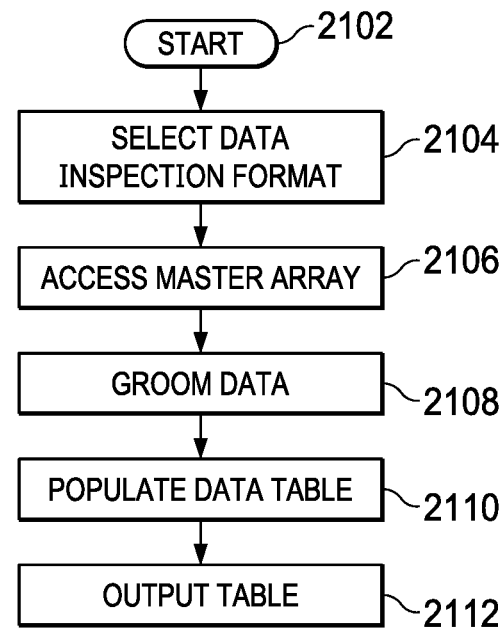
FIG. 21 illustrates a flow diagram for the generation of read/write data tables.

Another output format available from the scalable data tables 1514 of the generic database 1510 are read/write data tables that may be used for visual inspection of the data contained therein using the data formatting controller 1520. The tables may display the data obtained from multiple sources in close proximity for comparison purposes. The process for the generation of these read/write data tables is more fully illustrated in FIG. 21. If data within adjacent or closely related columns do not match, problems may be quickly noted within a wireless system configuration. The process is initiated at step 2102 and the particular data inspection format is selected at step 2104 by the data formatting controller 1520. The master data array within the generic database 1510 is accessed at step 2106 to populate the selected data inspection format. The accessed data is groomed at step 2108 into a format necessary for populating the selected data inspection format. The data that is output from the master data array has already been groomed prior to insertion of the data into the master data array. Thus, any further grooming would typically involve some decision based logic that would determine if the value being output is actually incorrect or in some way does not meet a predetermined requirement. Typically, if some logic is hard-coded or select did via an external user input, the method of displaying the failure would involve either changing the text color or background color to make the item stand out. The obtained data is used to populate the data table in the selected data inspection format at step 2110. The table is output through the format output interface 1526 to enable review of the data table for confirmation of network configurations.

Figure 22:
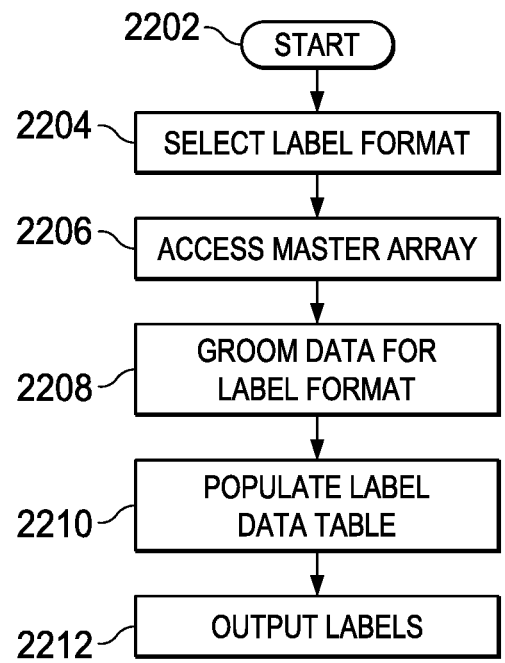
FIG. 22 illustrates a flow diagram of the process for creating labels.

Another data output format of the information within the generic database 1510 comprises labels for placement on cabling and hardware equipment within a wireless network. A delivery requirement of many hardware installations relating to wireless communications or other types of networks involves the placement of labels on the cables and hardware associated with the network. The labeling enables technicians in the future to properly maintain the network equipment so that they know what they are looking at with respect to a particular device or cable. The creation of the labels requires a great deal of time and effort in order to accurately create the labels for placement upon the network equipment. FIG. 22 illustrates the use of the previously created scalable data tables 1514 within the generic database 1510 for the creation of these labels through the data write controller 1522. The process begins at step 2202 and a particular label format 2204 is selected using the data write controller 1522 that selects a predetermined labeling format. Responsive to the selected label format, the master data array within the generic database 1510 is accessed at step 2206 to extract the required data for filling in the labels. The extracted data is groomed as needed to provide the label format at step 2208, and the groomed data populates a label data table at step 2210 that has been selected or created. The generated label data table from step 2210 may then be used for generating and outputting the labels at step 2212 that can be used for placement on system cabling and hardware components.

Figure 23:
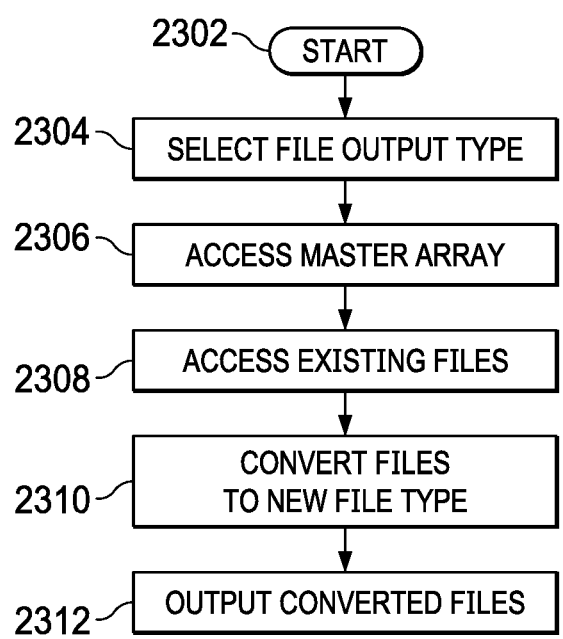
FIG. 23 illustrates a flow diagram of a file format conversion process.

A further file type output possibility from the generic database 1510 is a file format conversion from the format in which a file was originally received by the database 1510 as shown in FIG. 23. The file conversion utilizes the file format controller 1524 to control the output format of the file that is being provided through the output interface 1526. The process is initiated at step 2302 and the file format controller 1524 is used to select a file output type at step 2304. The master data array within the generic database 1510 is accessed at step 2306 to access existing files at step 2308 that have previously been stored within the database. The files may comprise downloaded files before the data extraction process. The existing files may comprise data as previously downloaded using the remote file access and download controller 1506 or the post processing format of these files. The accessed data files are converted to a new file type at step 2210 that has been selected at step 2304. The converted data files may then be output at step 2312 through the output interface 1526.

Using the above described system and method data from a variety of disparate data sources may be accessed and processed to enable the relevant data contained within those files to be stored within a generic database. Utilizing the information stored within the generic database a variety of output file configuration may be selected for utilizing the data to present, check, manage, etc. the data that is stored within the generic database. This allows a variety of disparate types of information to be stored in a generic format that enables the information to be used in a variety of different ways and thus speed what normally comprises slow user intensive processes.

It will be appreciated by those skilled in the art having the benefit of this disclosure that this system and method for managing and presenting communications and data provides an improved manner for managing and presenting data with respect to network components. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A method for managing network system hardware configuration data and system hardware connection data for a wireless communications network, comprising:

selecting an input source within the wireless communications network of a plurality of input source types that are source types within the wireless communications network;

accessing the selected input source within the wireless communications network, the selected input source within the wireless communications network providing access to data associated with the selected input source, at least a portion of the data comprising predetermined system hardware configuration data and system hardware connection data in a first format;

harvesting the portion of the data within the selected input source within the wireless communications network containing the predetermined system hardware configuration data and system hardware connection data in the first format;

extracting the predetermined system hardware configuration data and system hardware connection data in the harvested portion of the data;

converting the extracted predetermined system hardware configuration data and system hardware connection data in the first format into a generic data format;

storing the predetermined system hardware configuration data and system hardware connection data in the generic data format within a data array;

selecting an output format of a predetermined plurality of output formats for the predetermined system hardware configuration data and system hardware connection data, wherein the selected output format comprises a selected file type different from a file type from which the predetermined system hardware configuration data and system hardware connection data were extracted, further wherein the selected output format comprises one format of a plurality of formats, the plurality of formats consisting of a data table format, a document template format, a label format, a predetermined file type format and a backup and restore file format;

generating the predetermined system hardware configuration data and system hardware connection data in the selected output format from the stored predetermined system hardware configuration data and system hardware connection data within the data array in the generic data format; and outputting the generated predetermined system hardware configuration data and system hardware connection data in the selected output format.

2. The method of claim 1, wherein the input source provides a first file type of a plurality of file types.

3. The method of claim 2, wherein the first file type comprises at least one of a PDF file, a TXT file and an XLS file.

4. The method of claim 1, wherein the input source comprises a live data source.

5. The method of claim 1, wherein the input source comprises at least one of a PDF file, a text file, an XLS file, a path calculation data sheet, a microwave path data sheet and a device configuration table.

6. A system for managing system hardware configuration data and system hardware connection data, comprising:
- a database for storing predetermined system hardware configuration data and system hardware connection data in a generic format within a data array;
- a processor coupled to the database; and
- a memory coupled to the processor, the memory storing a plurality of instructions for execution by the processor, the plurality of instructions including:
  - instructions for selecting an input source within a wireless communications network of a plurality of input source types that are source types within the wireless communications network;
  - instructions for accessing the selected input source within the wireless communications network, the selected input source within the wireless communications network providing access to data associated with the selected input source, at least a portion of the data comprising predetermined system hardware configuration data and system hardware connection data in a first format;
  - instructions for harvesting the portion of the data within the selected input source within the wireless communications network containing the predetermined system hardware configuration data and system hardware connection data in the first format;
  - instructions for extracting the predetermined system hardware configuration data and system hardware connection data in the harvested portion of the data;
  - instructions for converting the extracted predetermined system hardware configuration data and system hardware connection data in the first format into a generic data format;
  - instructions for storing the predetermined system hardware configuration data and system hardware connection data in the generic data format within a data array;
  - instructions for selecting an output format of a predetermined plurality of output formats for the predetermined system hardware configuration data and system hardware connection data, wherein the selected output format comprises a selected file type different from a file type from which the predetermined system hardware configuration data and system hardware connection data were extracted, further wherein the selected output format comprise one format of a plurality of formats, the plurality of formats consisting of a data table format, a document template format, a label format, a predetermined file type format and a backup and restore file format;
  - instructions for generating the predetermined system hardware configuration data and system hardware connection data in the selected output format from the stored predetermined system hardware configuration data and system hardware connection data within the data array in the generic data format; and
  - instructions for outputting the generated predetermined system hardware configuration data and system hardware connection data in the selected output format.

7. The system of claim 6, wherein the input source provides a first file type of a plurality of file types.

8. The system of claim 7, wherein the first file type comprises at least one of a PDF file, a TXT file and an XLS file.

9. The system of claim 6, wherein the input source comprises a live data source.

10. The system of claim 6, wherein the input source comprises at least one of a PDF file, a text file, an XLS file, a path calculation data sheet, a microwave path data sheet and a device configuration table.

11. A system, comprising:
- a database for storing predetermined system hardware configuration data and system hardware connection data in a generic format within a data array;
- a system for managing network parameter data, comprising:
  - an interface for connecting with an input source;
  - an input source selection controller for selecting an input source within the wireless communications network of a plurality of input source types that are source types within the wireless communications network, wherein the input source comprises at least one of a PDF file, a text file, an XLS file, a path calculation data sheet, a microwave path data sheet and a device configuration table;
  - a file access controller for accessing the selected input source within the wireless communications network, the selected input source within the wireless communications network providing access to data associated with the selected input source, at least a portion of the data comprising predetermined system hardware configuration data and system hardware connection data in a first format;
  - a data extraction controller for extracting the predetermined system hardware configuration data and system hardware connection data in the data of the selected input source, for converting the extracted predetermined system hardware configuration data and system hardware connection data in the first format into the generic format, and for storing the predetermined system hardware configuration data and system hardware connection data in the generic format within a data array in the database;
  - an output selection controller for selecting an output format of a predetermined plurality of output formats for the predetermined system hardware configuration data and system hardware connection data, wherein the selected output format comprises a selected file type different from a file type from which the predetermined system hardware configuration data and system hardware connection data were extracted, further wherein the selected output format comprise one format of a plurality of formats, the plurality of formats consisting of a data table format, a document template format, a label format, a predetermined file type format and a backup and restore file format;
  - an output file generation controller for generating the predetermined system hardware configuration data and system hardware connection data in the selected output format from the stored predetermined system hardware configuration data and system hardware connection data within the data array; and an output interface for outputting the generated predetermined system hardware configuration data and system hardware connection data in the selected output format.

* * * * *